C. BERGMANN.
EGG CUTTER.
APPLICATION FILED APR. 6, 1915.
1,175,922.
Patented Mar. 21, 1916.
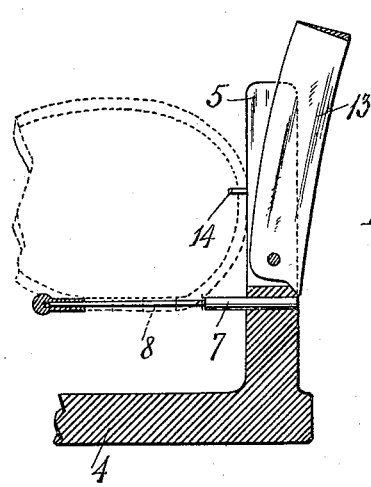
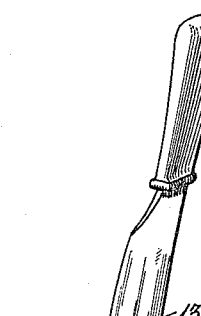
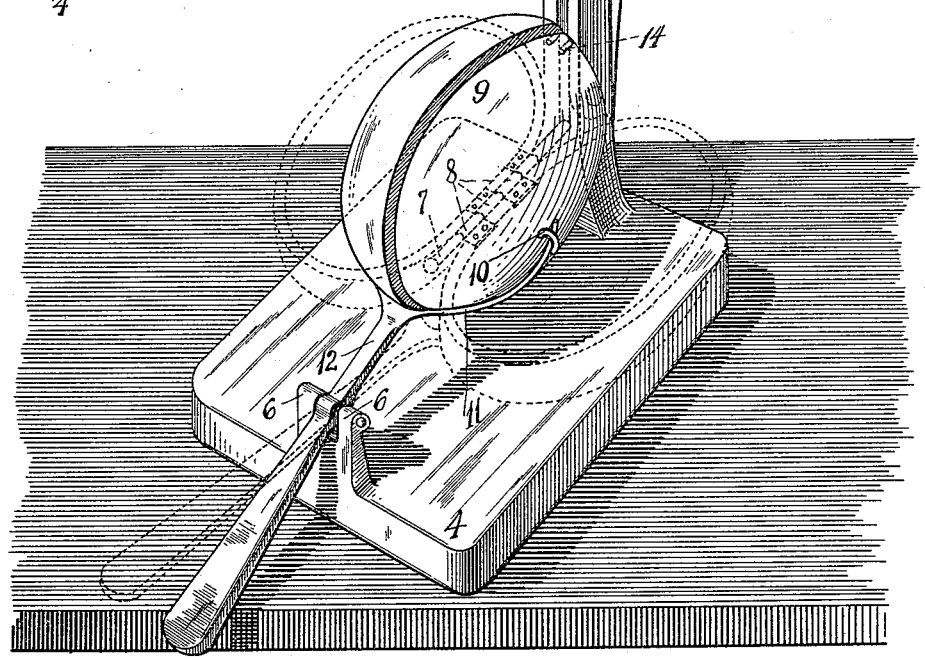
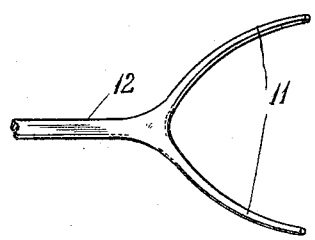
Witnesses:
Fred Roegen
Aladar Hamburger
Inventor
Charles Bergmann
By his Attorney
Alexander Veres
THE COLUMBIA PLANOGRAPH CO., WASHINGTON, D. C.

UNITED STATES PATENT OFFICE.

CHARLES BERGMANN, OF HACKENSACK, NEW JERSEY.

EGG-CUTTER.

1,175,922.　　　　Specification of Letters Patent.　　Patented Mar. 21, 1916.

Application filed April 6, 1915.　Serial No. 19,613.

*To all whom it may concern:*

Be it known that I, CHARLES BERGMANN, a subject of the Emperor of Germany, residing at Hackensack, in the county of Bergen and State of New Jersey, have invented new and useful Improvements in Egg-Cutters, of which the following is a specification.

This invention relates to an egg cutter and has as its object to provide a device by means of which so called "medium" and "hard boiled" eggs may conveniently be cut in halves in their shells.

In the accompanying drawing which shows the preferred form of embodiment of my invention: Figure 1 is a perspective view of my device, ready for operation, showing some parts in the position after operation, in dotted lines. Fig. 2 is a partly sectional, partly elevational view of my device, some parts being broken away. Fig. 3 is a fractional, elevational detail view of a part of my device.

The same part is designated by the same reference character throughout the several views.

Referring more particularly to the drawing, 4 is a base on which are mounted vertical pedestals 5 and 6, centrally of the rear and front edges, respectively, of the base 4, in alinement with each other.

A horizontal pin 7 is carried by the pedestal 5, projecting forward therefrom, near the base. Hinges 8 are provided on the pin 7, connecting a pair of semi-oval shells 9 thereto. Each of the shells 9 carries a staple 10 at its outside, below its center, the staples being engaged each by a prong 11 of a forked lever 12 pivoted to the pedestal 6.

The upper end of the pedestal 5 is slotted nearly to the pin 7 and a knife 13 is pivoted in the slot, near the bottom thereof.

A pair of studs 14 is formed on the pedestal 5, one near either edge of the slot.

The operation of my device is as follows: The boiled egg is placed within the pair of shells 9 and the outer arm of the lever 12 is pressed down, whereby the prongs 11 keep the shells 9 closed as seen in full lines in Fig. 1, the studs 14 preventing their being closed tight. The knife 13 is then brought down and enters between the shells 9 in an obvious manner, cutting the egg placed there into halves. The lever 12 is then released, whereon the shells will fold down on their hinges 8 and the halves of the egg will be open for removal.

The base, pedestals, pin and studs are preferably formed integrally, the pin having notches for the accommodation of the hinges which may be applied thereon afterward.

While I have thus shown and described the preferred form of embodiment of my invention, it will be understood that I do not want to be limited to its mechanical details and may resort to such alterations and modifications as come within the scope of the claims hereunto appended.

I claim:

1. An egg cutter comprising, in combination, a base, two vertical pedestals mounted on said base, one of said pedestals supporting a pair of semi-oval shells and a pivoted knife adapted to cut in between said shells, and the other of said pedestals supporting a lever adapted to keep said shells in a closed position, substantially as and for the purpose set forth.

2. An egg cutter comprising, in combination, a base, two vertical pedestals mounted in alinement on said base, a horizontal pin carried by one of said pedestals, a pair of semi-oval shells hingedly mounted on said pin, studs carried by said pedestal adapted to prevent said shells from being closed tight, and a lever pivotally mounted on the other of said pedestals, having its inner end forked, each of the prongs of said forked end being in operative engagement with one of said shells, substantially as and for the purpose set forth.

CHARLEY BERGMANN.

Copies of this patent may be obtained for five cents each, by addressing the "Commissioner of Patents, Washington, D. C."